United States Patent [19]

Yamada et al.

[11] Patent Number: 4,618,891
[45] Date of Patent: Oct. 21, 1986

[54] REFERENCE TIME DETECTING CIRCUIT

[75] Inventors: Hisafumi Yamada, Tokyo; Choei Kurik, Urawa; Junya Saito, Wako, all of Japan

[73] Assignee: Sony Corporation, Tokyo, Japan

[21] Appl. No.: 515,044

[22] PCT Filed: Oct. 21, 1982

[86] PCT No.: PCT/JP82/00417
§ 371 Date: Jun. 20, 1983
§ 102(e) Date: Jun. 20, 1983

[87] PCT Pub. No.: WO83/01553
PCT Pub. Date: Apr. 28, 1983

[30] Foreign Application Priority Data

Oct. 23, 1981 [JP] Japan ............................... 56-169907

[51] Int. Cl.$^4$ .......................... H04N 5/05; H04N 5/93
[52] U.S. Cl. .................................... 358/153; 358/154; 358/155; 358/167
[58] Field of Search ...................... 358/21 V, 153, 154, 358/155, 148, 156, 172, 167, 178, 905, 176, 177

[56] References Cited

U.S. PATENT DOCUMENTS 3,567,860  3/1971  Oliver ................................ 358/154
3,881,055  4/1975  Gerot ................................ 358/153
4,357,630  11/1982 Odaka ................................ 358/154
4,517,601  5/1985  Yamada ............................. 358/167

FOREIGN PATENT DOCUMENTS 64881  4/1983  Japan ................................ 358/148

Primary Examiner—Tommy P. Chin
Attorney, Agent, or Firm—Hill, Van Santen Steadman & Simpson

[57] ABSTRACT

A reference time detecting circuit has a video signal supplied to first and second clamping circuits (40) and (70) of different time constants and a synchronizing signal is separated from the output signal from the first clamping circuit (40) of a longer time constant, while a reference time is detected from the output signal from the second clamping circuit (70) of a shorter time constant. Consequently, since the two clamping circuits (40) and (70) of different time constants are provided, the clamping circuit (40) of longer time constant generates a signal having a sync-tip portion of a predetermined voltage to perform the accurate vertical synchronizing separation from which an accurate masking pulse is formed, while the clamping circuit (70) of shorter time constant generates a signal having a pedestal portion with a noise suppressed to thereby positively detect the rising edge of the synchronizing signal.

3 Claims, 18 Drawing Figures

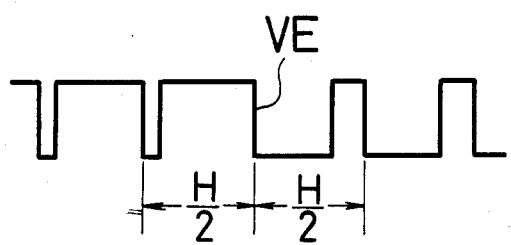
FIG. 2 (PRIOR ART)
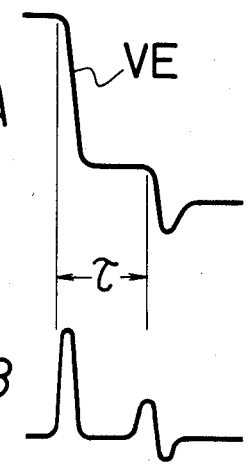
FIG. 3A (PRIOR ART)
FIG. 3B (PRIOR ART)
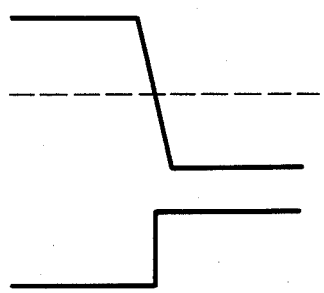
FIG. 5A
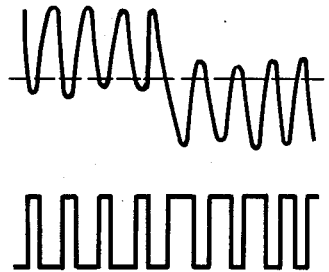
FIG. 5B
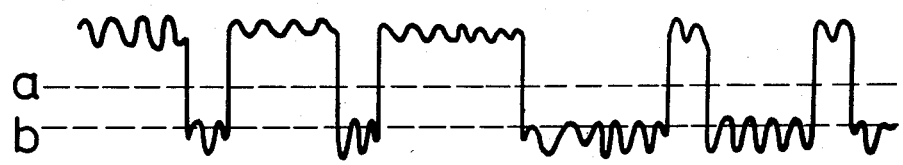
FIG. 6A
FIG. 6B
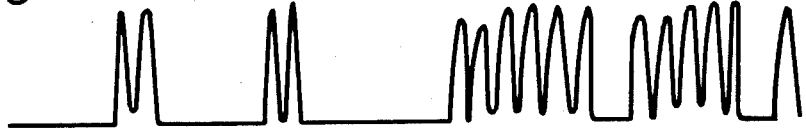
FIG. 6C

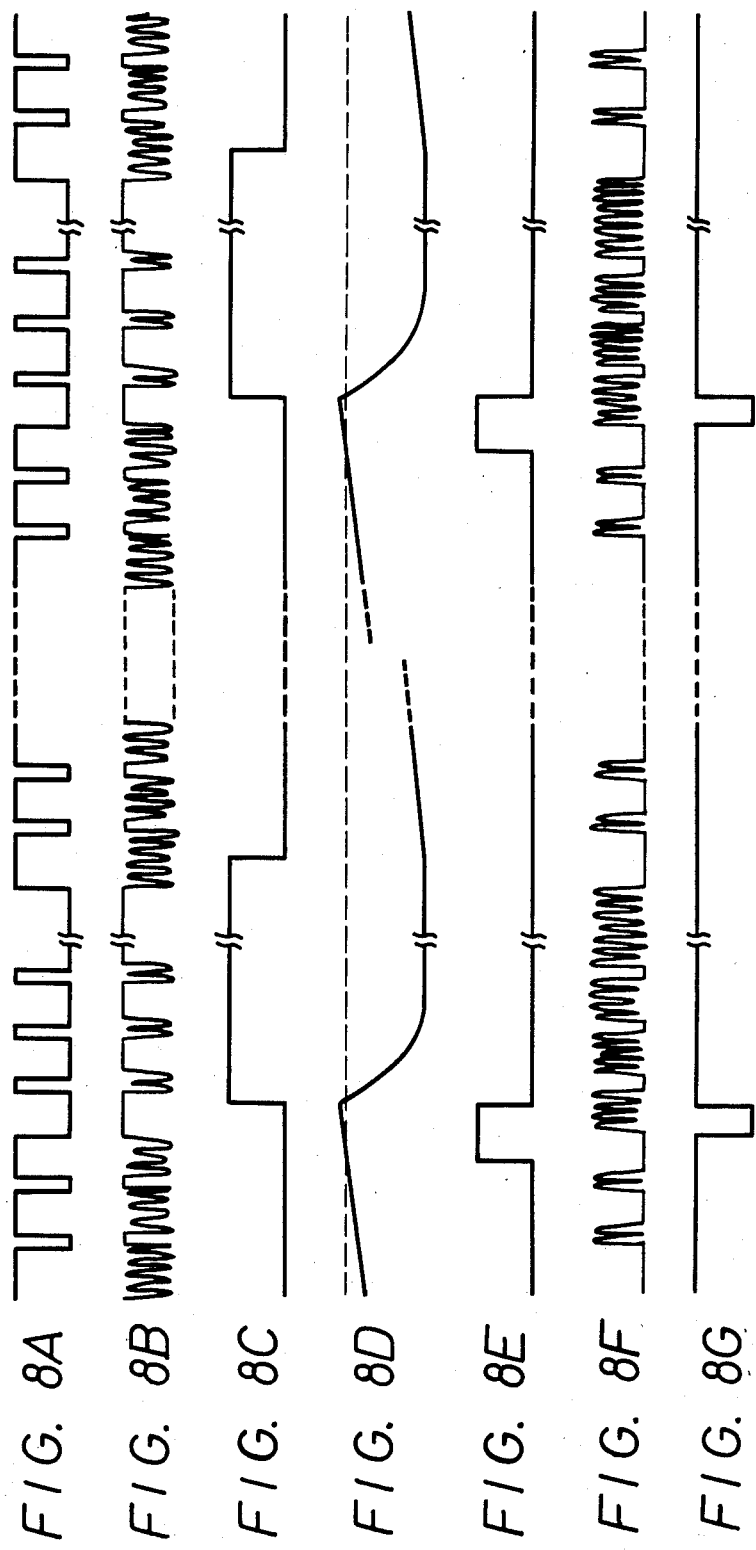

REFERENCE TIME DETECTING CIRCUIT

TECHNICAL FIELD

This invention relates to a reference time detecting circuit suitable for use with a ghost signal cancelling apparatus which cancels out a ghost in, for example, a video signal stage.

BACKGROUND ART

As, for example, shown in FIG. 1, a signal received by an antenna 1 is supplied through a tuner 2 and a video intermediate frequency amplifier 3 to a video signal detecting circuit 4 by which a video signal is detected. This video signal is supplied through a delay circuit 5 the delay time of which corresponds to the period of duration necessary for cancelling out a pre-ghost signal to a composer 6. Also, a ghost imitating signal from a transversal filter which will be described later is supplied to the composer 6 and thus the composer 6 supplies therefrom a video signal with a ghost signal eliminated to an output terminal 7.

The video signal derived from the video signal detecting circuit 4 is supplied to a delay circuit 8 which constructs the transversal filter. The delay circuit 8 is formed such that delay elements each of which has a sampling period (for example, 10 nano seconds) taken as a unit of delay are connected in plural stages (n in number) so as to achieve a delay time equal to the pre-ghost signal eliminating period and n taps are led out from the respective stages. The signals from the respective taps are supplied to weighting circuits $9_1, 9_2, \ldots 9_n$, each of which is formed of a multiplier.

The signal from the last stage of the delay circuit 8 is supplied to a terminal $10f$ of a mode switch 10, while the output signal from the composer 6 is supplied to a terminal $10b$ of the switch 10. The signal from the switch 10 is supplied to a delay circuit 11. The delay circuit 11 is formed such that delay elements, each of which has a sampling period taken as a unit of delay, are connected in plural stages (m in number) so as to achieve a delay time equal to the delay-ghost eliminating period and m taps are led out from the respective stages. The signals from the respective taps are supplied to weighting circuits $12_1, 12_2 \ldots 12_m$, each of which is formed of a multiplier.

The video signal from the composer 6 is supplied to a subtracting circuit 13. The video signal from the delay circuit 5 is supplied to a synchronizing separating circuit 14 and the separated vertical synchronizing signal therefrom is supplied to a standard waveform generating circuit 15 and a low-pass filter 16 wherein a standard waveform approximate to a step waveform of a rising edge VE of the vertical synchronizing signal is formed. The standard waveform is supplied to the subtracting circuit 13.

The signal from the subtracting circuit 13 is supplied to a differentiating circuit 17 which detects the ghost signal.

As a signal for detecting and measuring the ghost signal, used is such one that is contained in a standard television signal and not affected by other signal during a period of a duration as long as possible, for example, the vertical synchronizing signal. That is, as shown in FIG. 2, the portion between the rising edge VE of the vertical synchronizing signal and the period of $\pm\frac{1}{2}H$ (H represents the horizontal period) before and after it is not affected by other signal. Therefore, the afore-said standard waveform is subtracted from the signal of such period and the subtracted signal is differentiated to thereby detect a weighting factor.

If a video signal contains a ghost signal having, for example, a delay time $\tau$ and a phase difference $\phi(=\omega_c\tau$ where $\omega_c$ is a video carrier angular frequency in a high frequency stage) of 45° between it and the video signal, a video signal of a waveform shown in FIG. 3A appears. On the other hand, if such signal is differentiated and inverted in polarity, a ghost detecting signal of a differentiated waveform shown in FIG. 3B is obtained. This differentiated waveform can approximately be regarded as an impulse response of the ghost signal.

The ghost detecting signal of differentiated waveform appearing from the differentiating circuit 17 is supplied through an amplifier 18 to demultiplexers 19 and 20 connected in series. The demultiplexers 19 and 20 are formed in the same way as in the delay circuits 8 and 11 wherein delay elements, each of which has a sampling period taken as a unit of delay, are connected in plural stages and m and n taps are led out from respective stages. The outputs from the respective taps are supplied to switching circuits $21_1, 21_2, \ldots 21_n$ and $22_1, 22_2 \ldots 22_m$.

The vertical synchronizing signal from the synchronizing separating circuit 14 is supplied to a gate pulse generator 23 which then generates a gate pulse of a duration corresponding to the interval from the rising edge VE of the afore-said vertical synchronizing signal to the end of the $\frac{1}{2}H$ interval. This pulse turns on the switching circuits $21_1$ to $22_m$.

The signals from the switching circuits $21_1$ to $22_m$ are respectively supplied to analog accumulative adders $24_1, 24_2 \ldots 24_n$ and $25_1, 25_2 \ldots 25_m$. The signals from the analog accumulative adders $24_1$ to $25_m$ are respectively supplied to the weighting circuits $9_1$ to $9_n$ and $12_1$ to $12_m$.

The outputs from the weighting circuits $9_1$ to $9_n$ and $12_1$ to $12_m$ are added together in an adding circuit 26 thereby forming a ghost cancelling signal. This ghost cancelling signal is then supplied to the composer 6.

As set forth above, the delay circuits 8, 11, the weighting circuits $9_1$ to $9_n$, $12_1$ to $12_m$ and the adding circuit 26 constitute the transversal filter which serves to cancel out the ghost signal. In this case, the analog accumulative adders $24_1$ to $25_m$ are provided such that after the distortion of the waveform in the period between the rising edge of the vertical synchronizing signal and the $\pm\frac{1}{2}H$ interval before and after it is detected and the weighting factor is determined, if the ghost signal still remains not cancelled, the detection as afore-said is further carried out to reduce the ghost signal not yet cancelled.

The elimination of the delay-ghost signal can be changed to a feedforward mode and a feedback mode by switching the mode switch 10.

FIG. 4 shows a case in which an input-adding type transversal filter is employed to eliminate a ghost signal. In the figure, like parts corresponding to those of FIG. 1 are marked with the same references and will not be described in detail.

In the figure, the video signal from the video signal detecting circuit 4 is supplied to the weighting circuits $9_1$ to $9_n$, and the signals from the weighting circuits $9_1$ to $9_n$ are respectively supplied to input terminals of a delay circuit $8'$. The delay circuit $8'$ is formed such that n delay elements, each of which has a sampling period as a unit of delay, are connected and n input terminals are provided at portions between the respective stages.

The signals at the input and output sides of the composer 6 are supplied to terminals 10f and 10b' of a mode switch 10'. The signal from the switch 10' is supplied to the weighting circuits $12_1$ to $12_m$ and the signals from the weighting circuits $12_1$ to $12_m$ are respectively supplied to input terminals of a delay circuit 11'. The delay circuit 11' is formed such that m delay elements, each of which has a sampling period as a unit of delay, are connected and m input terminals are provided at portions between the respective stages thereof.

The signals derived from the last stages of the delay circuits 8' and 11' are added together in an adding circuit 26' so as to form a ghost cancelling signal. This ghost cancelling signal is supplied to the composer 6.

This circuit can also eliminate the ghost signal in the same way as in the afore-said circuit employing the output-adding type transversal filter.

Furthermore, in accordance with the afore-said circuit, without the differentiating circuit 17, a difference of outputs between the adjacent bits from the demultiplexers 19 and 20 is used to obtain a difference output and the weighting operation can be performed by the use of such difference output.

Moreover, if the demultiplexers 19, 20 and the delay circuits 8, 11 are used in common and upon determining the weighting amount, the weighting signals are supplied to the delay circuits and then stored in memory elements, the weighting operation can be carried out by the stored signals thereafter.

In this way, the ghost signal can be eliminated in, for example, the video signal stage.

By the way, in such ghost signal cancelling apparatus, the formation of the standard waveform and the switching timing of the switching circuits $21_1$ to $22_m$ are determined by, for example, the rising edge of the vertical synchronizing signal taken as a reference time. In that case, quite a high precision is required for the detection of the reference time and the experiment reveals that the precision must be within 35 nano seconds.

However, since the conventional synchronizing separating circuit includes therein a low-pass filter, a high frequency band range information is dropped and the rising edge or the like of the signal is blunted. As a result, if the reference time is detected from the vertical synchronizing signal thus separated, the reference time may be delayed.

Therefore, it has been proposed that a masking pulse of about ½H period long which includes the rising edge of, for example, the vertical synchronizing signal is formed and this masking pulse and the video signal are employed to directly detect the transit of the rising edge.

However, in the case of such previously proposed method, the influence of noise and so on causes an erroneous detection frequently. That is, when detecting the transit, a threshold level is provided to detect a time point at which the signal goes across this level. In general, this threshold level is selected as a half level between synctip and pedestal level. In that case, when a noise level is small as shown in FIG. 5A, quite a precise detection can be carried out. On the contrary, when as shown in FIG. 5B a noise level is large and this noise exceeds the half level, an error pulse occurs at each time so that the correct reference time cannot be detected.

The reason for this is that, since the influence of a synchronizing separating clamping circuit provided at the input side of the detecting circuit causes the sync-tip to pedestal portions to be enlarged enormously particularly when the electric field is weak and the noise level is also enlarged enormously in accordance therewith, a bad influence occurs easily.

In view of such aspects, the present invention is to provide a reference time detecting circuit for a video signal of a simple arrangement which can always detect a reference time accurately.

DISCLOSURE OF INVENTION

In this invention, a video signal is supplied to first and second clamping circuits of different time constants, and the synchronizing signal is separated from the output signal from the first clamping circuit of a longer time constant while the reference time is detected from the output signal from the second clamping circuit of a shorter time constant.

Thus, according to this invention, since two clamping circuits of different time constants are provided, the clamping circuit of the longer time constant generates a signal having the sync-tip portion of a predetermined voltage to perform the accurate vertical synchronizing separation from which an accurate masking pulse is formed, while the clamping circuit of the shorter time constant generates a signal having the pedestal portion with a noise suppressed to thereby accurately detect the rising edge of the synchronizing signal.

This invention is not limited to the detection of the rising edge of the vertical synchronizing signal but can also be applied to the detection of other reference time.

BRIEF DESCRIPTION OF DRAWINGS

FIGS. 1, 2, 3A, 3B, and 4 are respectively diagrams useful for explaining a ghost signal cancelling apparatus;

FIGS. 5A, 5B and 6A-6C are diagrams useful for explaining this invention;

FIG. 8A-8G are diagrams useful for illustrating operation of the present invention.

BEST MODE FOR CARRYING OUT THE INVENTION

An example of this invention will be hereinbelow described with reference to the attached drawings.

By the way, in a clamping circuit, if a time constant is adjusted by changing a clamping impedance, a threshold level can be varied equivalently. In that case, if a threshold level as shown by a broken line a is provided for a synchronizing signal as, for example, shown in FIG. 6A, the output signal therefrom becomes as shown in FIG. 6B. If a threshold level as shown by a broken line b is set, the output signal therefrom becomes as shown in FIG. 6C. The signal in FIG. 6B has a predetermined voltage formed on its portion corresponding to a sync-tip portion (the portion of low voltage in FIG. 6A), while the signal in FIG. 6C has a noise suppressed on its portion corresponding to a pedestal portion (the portion of high voltage in FIG. 6A).

Figure 1:
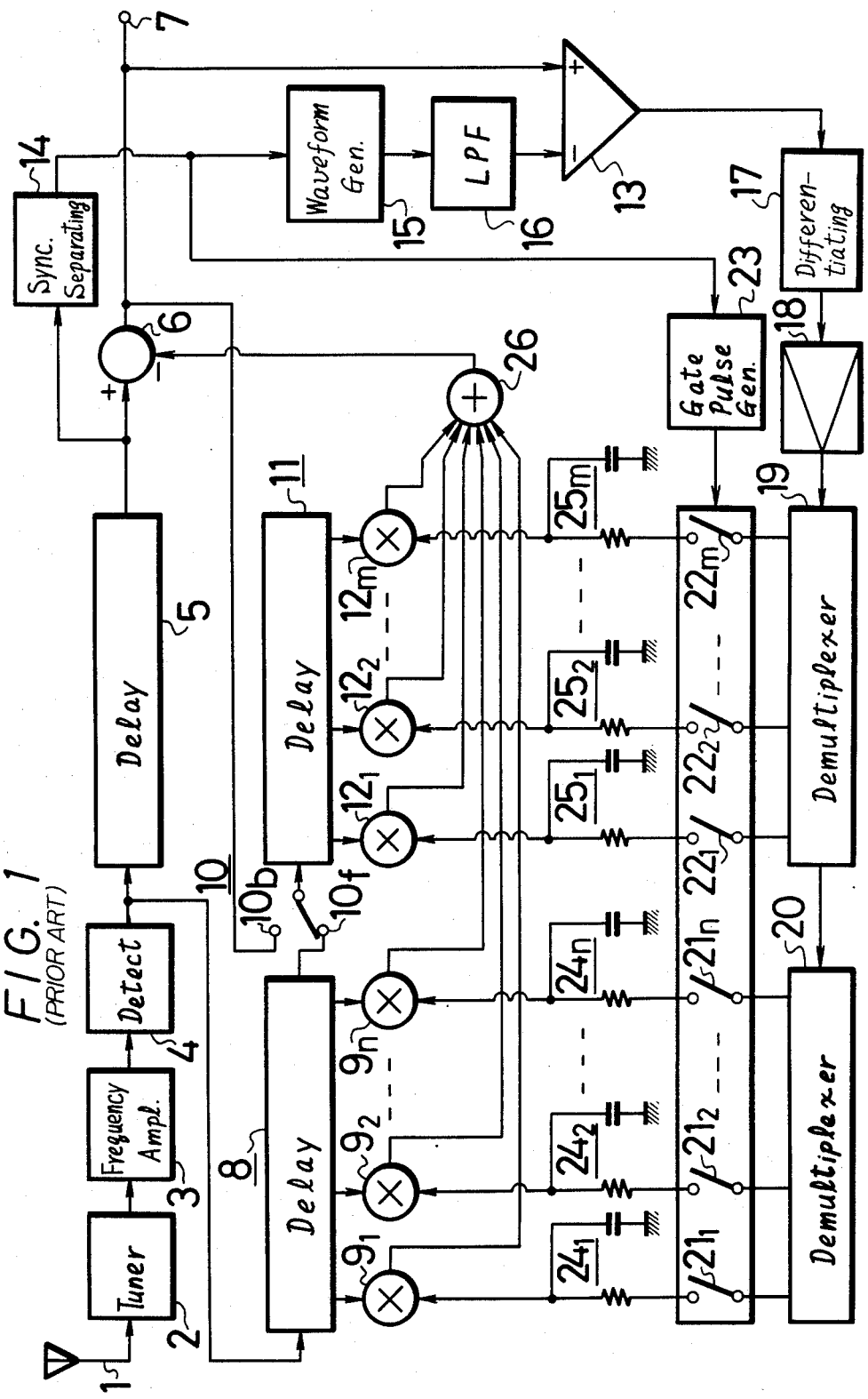
Figure 4:
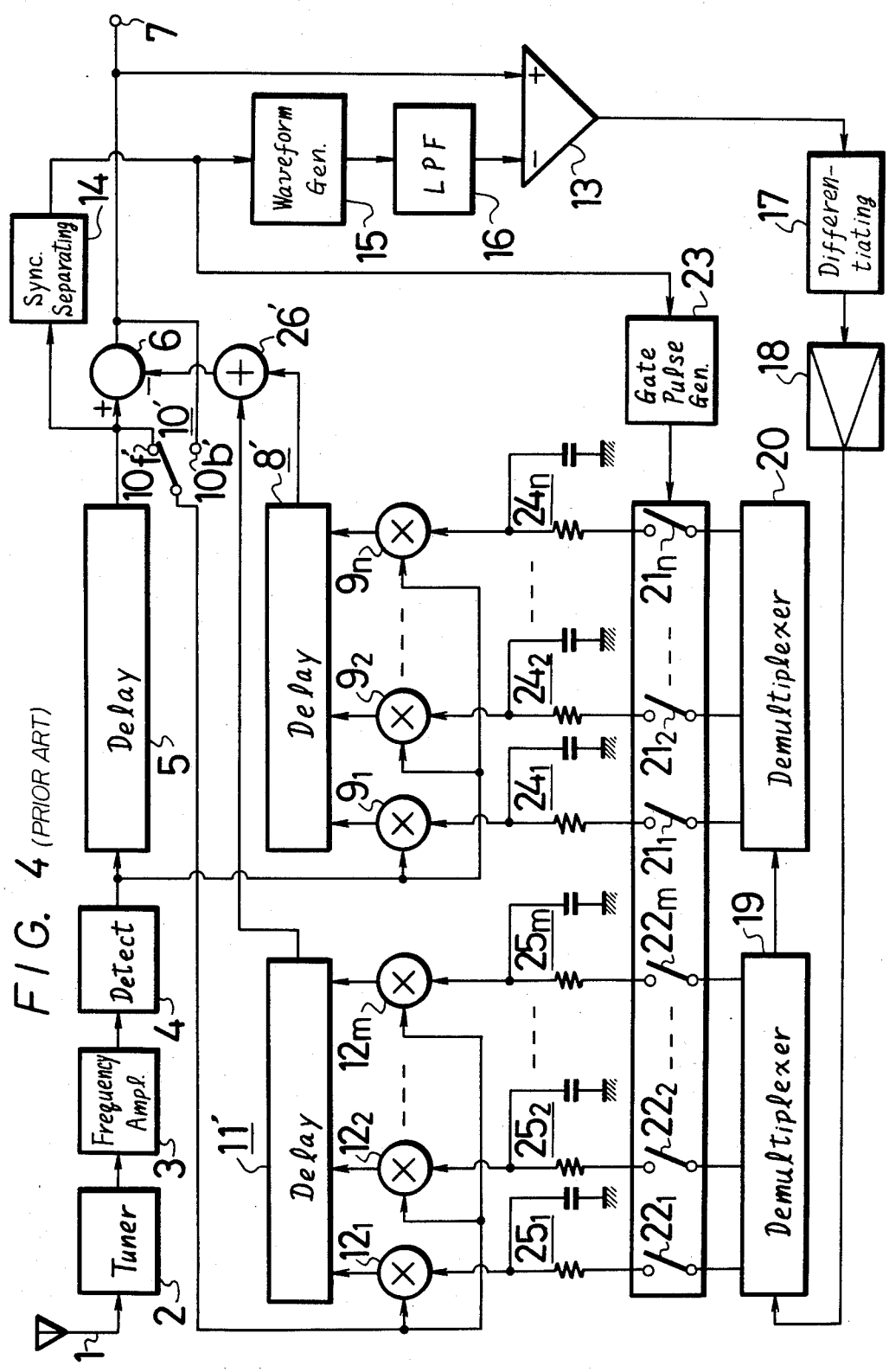
Figure 7:
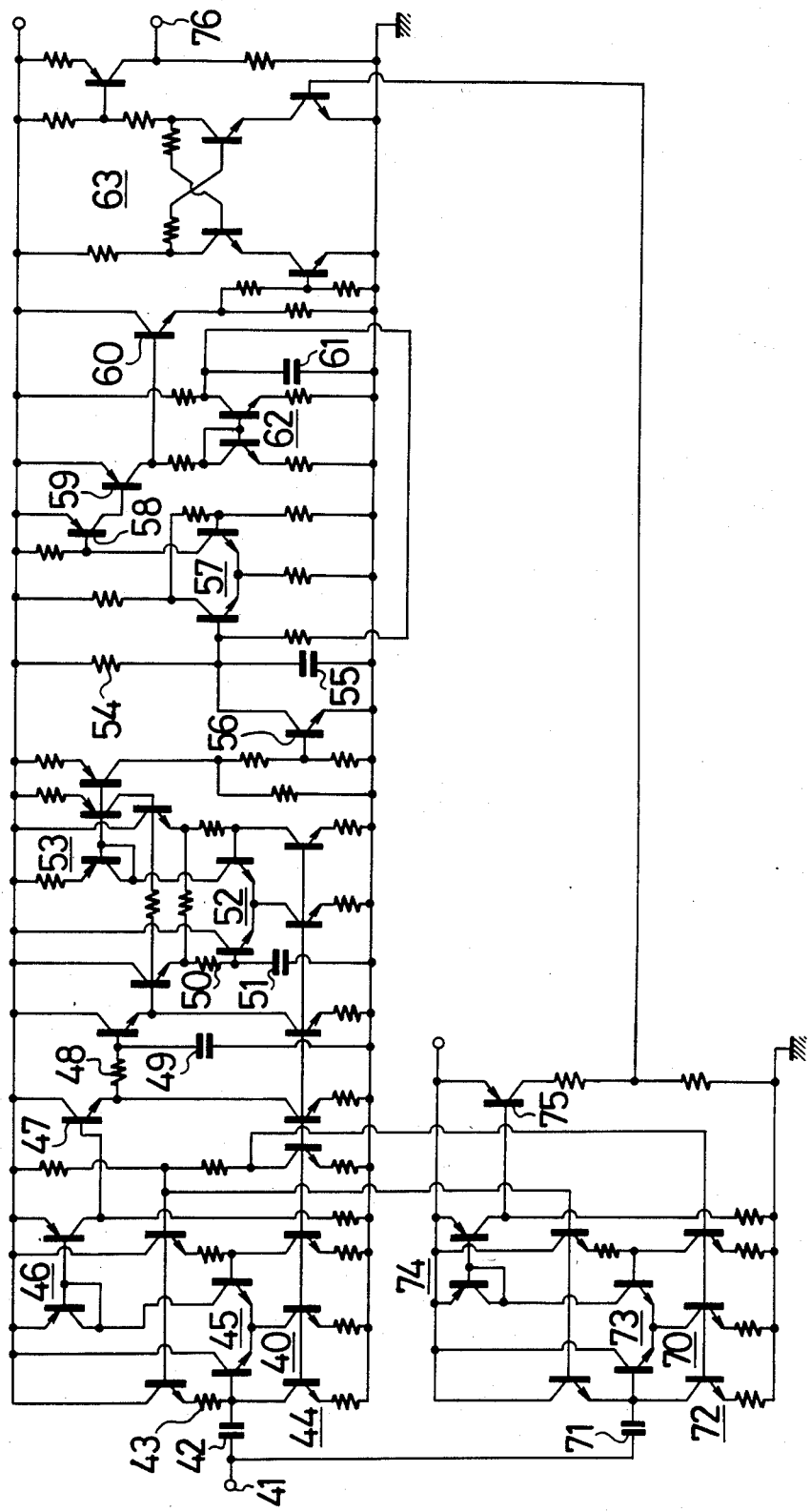
FIG. 7 is a circuit diagram of an embodiment according to this invention.

In FIG. 7, reference numeral 41 denotes an input terminal to which a video signal as, for example, shown in FIG. 8A is supplied. The signal applied to the terminal 41 is supplied through a clamping capacitor 42 to the connection point between a clamping resistor 43 and a constant current source 44. The signal at this connection point is supplied to a clamping differential amplifier 45 thus a clamping circuit 40 being formed. The signal from the clamping circuit 40 is supplied through a current mirror circuit 46 to a transistor 47. The clamping impedance is determined by the resistor 43 to provide a predetermined time constant so that a clamping level is raised and a signal as shown in FIG. 8B appears at the emitter of the transistor 47.

This signal is supplied to a low-pass filter formed of a resistor 48 and a capacitor 49. The signal from the low-pass filter is grounded via a resistor 50 and a capacitor 51 and is supplied to a differential amplifier 52, and a positive feedback is applied to this differential amplifier 52 via a current mirror circuit 53 thus forming an integration circuit. Accordingly, the current mirror circuit 53 derives a vertical synchronizing signal as shown in FIG. 8C.

This vertical synchronizing signal is supplied to a triangular wave generating circuit formed of a resistor 54, a capacitor 55 and a transistor 56 which generates a signal as shown in FIG. 8D. This signal is supplied to one input terminal of a differential amplifier 57 and a reference voltage as shown by a broken line in FIG. 8D is supplied to the other input terminal thereof, and further a positive feedback is applied to the differential amplifier 57 thus forming a Schmitt trigger circuit. The signal from the Schmitt trigger circuit is supplied through transistors 58 and 59 to a transistor 60 so that the transistor 60 derives a masking pulse as shown in FIG. 8E.

There is further provided a charging and discharging capacitor 61 and the signal from the transistor 59 is supplied to a current mirror circuit 62 by which the discharging path of the capacitor 61 is controlled. If, for example, the time constant of the charging path of the capacitor 61 is selected to be more than 16 m sec and that of the discharging path thereof is selected to be 30 μsec, the capacitor 61 derives a voltage which, in response to the width of the masking pulse, decreases when the width is widened and increases when it is narrowed. This voltage is supplied to the triangular wave generating circuit so that when the width of the masking pulse is widened, the inclination of the slope of the triangular wave is reduced. Thus, it takes much time to reach the reference voltage and the pulse width is narrowed, namely, a negative feedback is applied so that the position at which the masking pulse is formed is made stable. This masking pulse is supplied to a reset terminal of an RS flip-flop circuit 63.

Meanwhile, the signal applied to the terminal 41 is supplied through a clamping capacitor 71 to a constant current source 72. The signal at the connection point therebetween is supplied to a clamping differential amplifier 73 thus forming a clamping circuit 70. The signal from this clamping circuit 70 is supplied through a current mirror circuit 74 to a transistor 75. Since the clamping circuit 70 has no impedance corresponding to the resistor 43, the time constant thereof becomes extremely short. Consequently, the clamping level comes close to the top end so that a signal as shown in FIG. 8F appears at the emitter of the transistor 75. This signal is supplied to the set terminal of the flip-flop circuit 63.

This flip-flop circuit 63 is reset at the rising edge of the masking pulse and set at the first rising edge of the signal from the clamping circuit 70 to thereby allow a signal corresponding to the rising edge of the vertical synchronizing signal as shown in FIG. 8G to appear at an output terminal 76.

As described above, the reference time is detected. According to the present invention, since two clamping circuits of different time constants are provided, the clamping circuit of longer time constant generates the signal having the sync-tip portion of a predetermined voltage to perform the accurate vertical synchronizing separation by which the accurate masking pulse is formed, while the clamping circuit of shorter time constant generates the signal having a pedestal portion with a noise suppressed to thereby positively detect the rising edge of the synchronizing signal.

This invention is not limited to the detection of the rising edge of the vertical synchronizing signal but can also be applied to the detection of other reference time.

We claim:

1. A reference time detecting circuit for a video signal having a video signal source for supplying a video signal including vertical and horizontal synchronizing signals, with a transit portion of a predetermined synchronizing signal being selected as a reference time point; comprising in combination, a first clamping circuit (40) connected to said video signal source, a second clamping circuit (70) connected to said video signal source, the time constant of said second clamping circuit being shorter than that of said first clamping circuit, a masking pulse generator connected to said first clamping circuit for generating a masking pulse at a time corresponding to said reference time point, and detecting means connected between said masking pulse generator and one of said clamping circuits for detecting said transit portion during said masking pulse and for obtaining a timing signal accurately corresponding to said transit portion.

2. A reference time detecting circuit according to claim 1, wherein said detecting means includes a flip flop circuit operated during said masking pulse and triggered by the rising edge of said predetermined synchronizing signal.

3. A reference time detecting circuit according to claim 1, wherein said predetermined synthronizing signal is a vertical synchronizing signal and said transit portion is a rising edge thereof.

* * * * *